(12) United States Patent
Mullin et al.

(10) Patent No.: US 8,350,677 B2
(45) Date of Patent: Jan. 8, 2013

(54) SYSTEM AND METHOD FOR INTEGRATING ASSET TAGGING WITH A MANUFACTURING PROCESS

(75) Inventors: John Mullin, Scotland (GB); David J. Trotter, Scotland (GB); John Herrick, Glasgow (GB); Reza Koohrangpour, Austin, TX (US); Stuart Ross Hobbie, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 441 days.

(21) Appl. No.: 12/577,262

(22) Filed: Oct. 12, 2009

(65) Prior Publication Data

US 2011/0084813 A1   Apr. 14, 2011

(51) Int. Cl.
  *H04Q 5/22* (2006.01)
  *G05B 19/00* (2006.01)
  *G08B 13/14* (2006.01)
  *G06F 19/00* (2006.01)
  *G06F 7/00* (2006.01)

(52) U.S. Cl. ............ 340/10.4; 340/10.41; 340/10.42; 340/10.5; 340/10.6; 340/5.21; 340/572.1; 700/115; 700/213; 700/215; 700/221; 700/227

(58) Field of Classification Search ............ 340/10.4, 340/10.41, 10.42, 10.5, 10.6, 5.21, 572.1; 700/115, 213, 215, 221, 222, 224–227; 705/2–3, 705/7, 8, 9, 22, 28, 36; 235/385; 709/201
See application file for complete search history.

(56) References Cited

U.S. PATENT DOCUMENTS

| | | | |
|---|---|---|---|
| 6,529,799 B1 * | 3/2003 | Paulk et al. | 700/227 |
| 6,578,013 B1 * | 6/2003 | Davis et al. | 705/26.35 |
| 7,062,455 B1 * | 6/2006 | Tobey | 705/28 |
| 7,117,169 B2 * | 10/2006 | Zara et al. | 705/28 |
| 7,194,323 B2 * | 3/2007 | Kritt et al. | 700/97 |
| 7,382,259 B2 * | 6/2008 | Yun | 340/572.1 |
| 7,471,570 B2 * | 12/2008 | Morton et al. | 365/185.28 |
| 7,633,392 B2 * | 12/2009 | Neuwirth | 340/572.1 |
| 7,654,464 B2 * | 2/2010 | Babine et al. | 235/487 |
| 7,683,780 B2 * | 3/2010 | Reynolds | 340/572.1 |
| 7,711,702 B2 * | 5/2010 | Smolen et al. | 707/715 |
| 7,747,738 B2 * | 6/2010 | Ellisor, Jr. | 709/224 |
| 7,954,711 B2 * | 6/2011 | Adstedt et al. | 235/385 |
| 2003/0225650 A1 * | 12/2003 | Wilson et al. | 705/36 |
| 2003/0233287 A1 * | 12/2003 | Sadler et al. | 705/28 |
| 2006/0100889 A1 * | 5/2006 | Gosko | 705/1 |
| 2007/0162258 A1 * | 7/2007 | Lin et al. | 702/186 |
| 2009/0018957 A1 * | 1/2009 | Adams et al. | 705/40 |

* cited by examiner

*Primary Examiner* — Daniel Wu
*Assistant Examiner* — Mancil Littlejohn
(74) *Attorney, Agent, or Firm* — Larson Newman, LLP

(57) ABSTRACT

A system includes an ordering module, an asset tagging module, a database, and a manufacturer server. The ordering module is configured to receive an order for a component from a web browser. The asset tagging module is configured to receive information for an asset tag from the web browser, and to receive a selection of a location on the component to place the asset tag. The database is configured to store the order for the component, the information for the asset tag, and the location of the asset tag on the component. The manufacturer server is configured to retrieve the order for the component, the information for the asset tag, and the location of the asset tag on the component, and to direct printing of the information on the asset tag and placement of the asset tag at the location on the component prior to placing the component in packaging for the component.

19 Claims, 5 Drawing Sheets

SYSTEM AND METHOD FOR INTEGRATING ASSET TAGGING WITH A MANUFACTURING PROCESS

FIELD OF THE DISCLOSURE

This disclosure relates generally to information handling systems, and more particularly relates to a system and a method for integrating asset tagging with a manufacturing process.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An asset tag is a label that identifies the item or component to which it is attached, such as a server, desktop computer, laptop computer, or a peripheral device. The asset tag may be used for tracking and inventory of the asset. Although an asset tag is usually a physical label, such as a bar code or customer box label, an electronic asset tag may be embedded in the basic input/output system (BIOS) memory of a computer. Unlike a physical label, which can be removed or damaged, the embedded electronic asset tag can provide permanent identification of the item or component. Thus, items and/or components can be tracked and inventoried using physical asset tags and/or embedded electronic asset tags.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
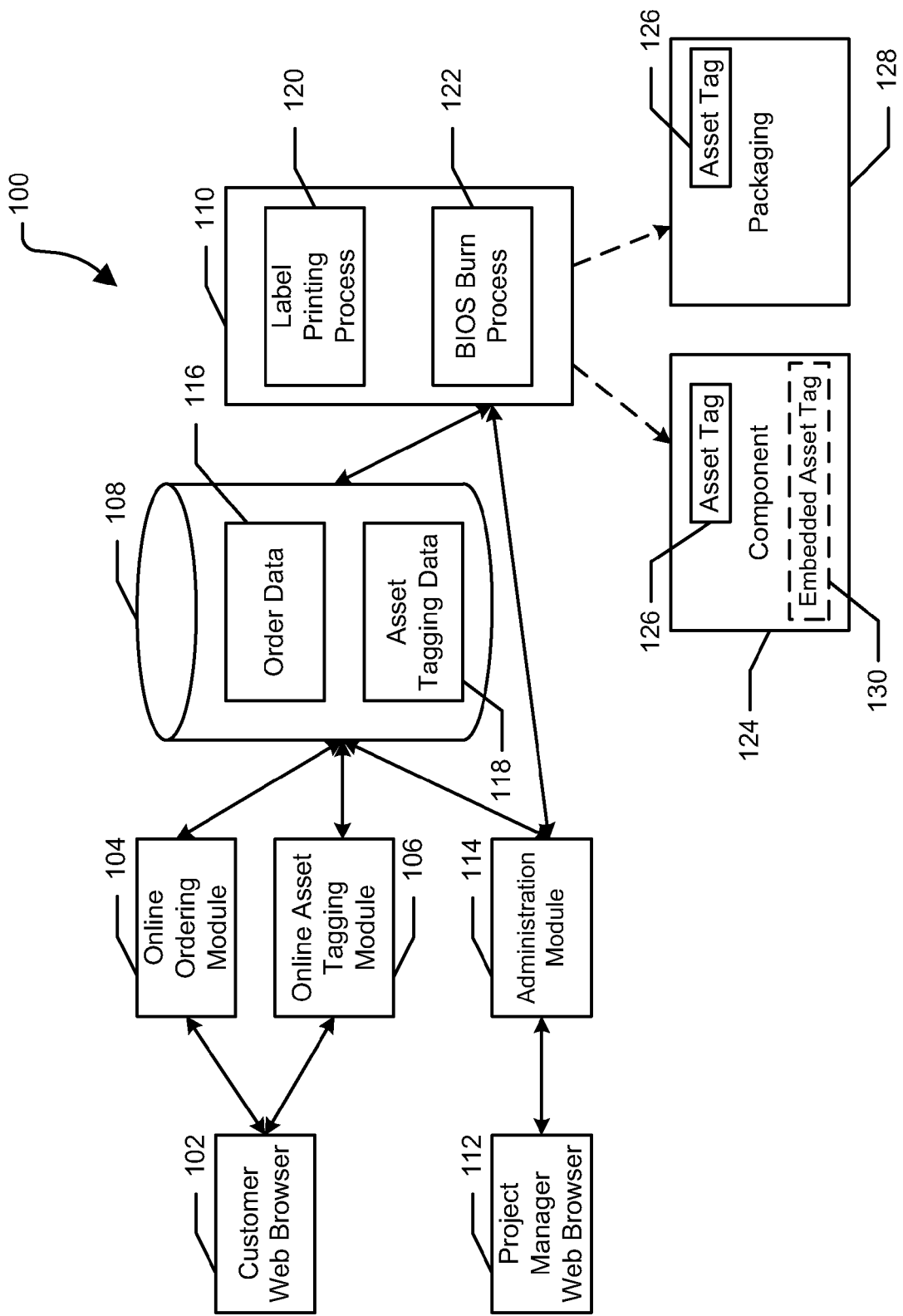
FIG. 1 is a block diagram of an online asset tagging system.

FIG. 1 shows an asset tagging system 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The asset tagging system 100 includes a user web browser 102, an online ordering module 104, an online asset tagging module 106, and a database 108. The asset tagging system 100 also includes a manufacturer server 110, an administrator web browser 112, and an administration module 114. The user web browser 102 is in communication with the online ordering module 104 and the online asset tagging module 106. The database 108 is in communication with the online ordering module 104, the online asset tagging module 106, and the manufacturer server 110. The administrator web browser 112 is in communication with the administration module 114, which in turn is in communication with the database 108 and with the manufacturer server 110. The database 108 preferably stores order data 116 and asset tagging data 118. The manufacturer server 110 preferably performs a label printing process 120 and a BIOS burn process 122 discussed more fully below.

A user can utilize the user web browser 102 to access the online ordering module 104. The online ordering module 104, the online asset tagging module 106, and the administration module 114 can be hardware, software, and/or any combination of hardware and software. While in communication with the online ordering module 104, the user web browser 102 can display different graphical user interfaces, so that the user can navigate through the online ordering module to select and order different components 124. The components 124 can include a desktop computer, a notebook computer, a server, a server rack, a monitor, a keyboard, a pointing device, and the like. While ordering the component 124, the user can utilize the user web browser 102 and the online ordering module 104 to select different features for the component, such as type, model number, and the like. When the user has selected the different features for the component 124, the online ordering module 104 can store the order information for the component in the order data 116 portion of the database 108. After the user has completed placing the online order for the component 124, the user web browser 102 can be connected with the online asset tagging module 106, such that an asset tagging graphical user interface 200 can be displayed on the user web browser as shown in FIG. 2.

Figure 2:
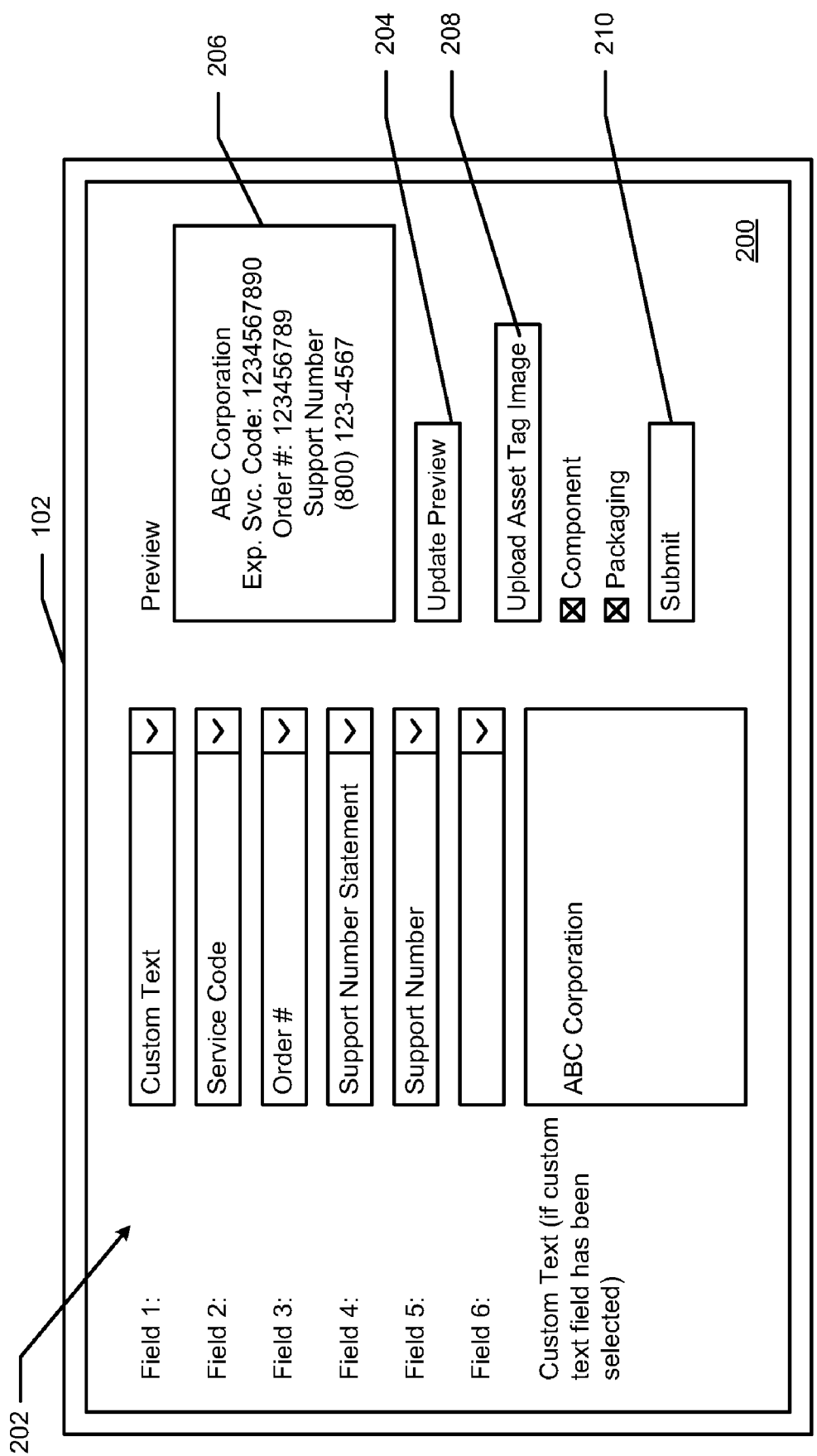
FIG. 2 is an exemplary screen shot of an asset tagging graphical user interface.

FIG. 2 shows an exemplary screen shot of the asset tagging graphical user interface 200 including a text field selection 202, an update preview button 204, a tag preview 206, an upload asset tag image button 208, and a submit button 210. The user can change the different fields of an asset tag 126 shown in FIG. 1 by selecting an option from the drop down menu associated with each of the text fields within the text field selection 202. For example, the user can select that the first field displayed on the asset tag 126 is custom text, such as a company name associated with the user. If the user selects custom text for the first field, the user can insert the desired text in the custom text box at the end of the text field selection 202.

Alternatively, the user can select from the drop down menus the service code number for the component 124, the order number associated with the component, text indicating that the support telephone number is included, the support telephone number, and the like. When the user has selected the desired text for each field in the text field selection 202, the user can select the update preview button 204 and the tag preview 206 can be updated with the selected text. Additionally, the user can select the upload asset tag image button 208, so that the user can use a previously created image as the asset tag 126. When the image is uploaded, the asset tag preview 206 can be updated with the uploaded image. When the user has finished creating the asset tag 126, the user can elect to have the asset tag placed on the component 124, on packaging 128 as shown in FIG. 1 for the component, or on both the component and the packaging. After selecting to place the asset tag 126 on the component 124 and/or the packaging 128, the user can select the submit button 210. The online asset tagging module 106 can then display an asset tag placement graphical user interface 300 on the user web browser 102 as shown in FIG. 3.

Figure 3:
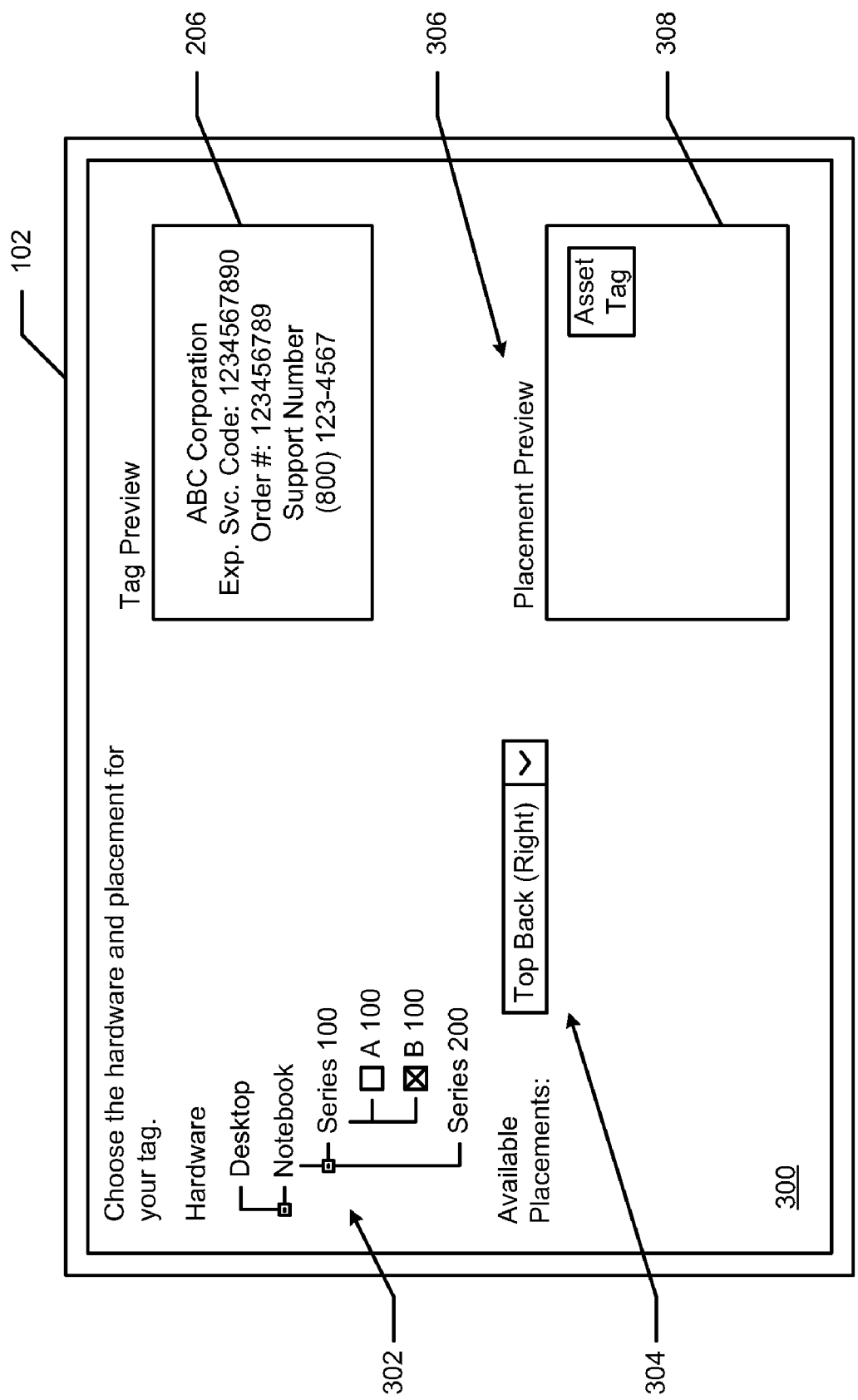
FIG. 3 is an exemplary screen shot of an asset tag placement graphical user interface.

FIG. 3 shows an exemplary screen shot of an asset tag placement graphical user interface 300 including a hardware selection 302, a placement selection drop down menu 304, and a placement preview 306. The placement preview 306 preferably includes a component image 308. The asset tag 126 generated on the asset tagging graphical user interface 200 can be displayed as the asset tag preview 206 so that the user can verify that the asset tag is correct. The user can then use the hardware selection 302 to select the type and series of the component 124. For example, the component 124 ordered can be a notebook computer, within the one hundred series, and model number B 100 as shown selected in FIG. 3.

When the model number for the component 124 has been selected, the placement selection drop down menu 304 can be updated to include different locations on the component that the asset tag 126 may be placed. The online asset tagging module 106 can have the locations of different logos already affixed on the component 124 saved in a memory so that the asset tag 126 is not placed in a location that would cover a pre-existing logo. Thus, the online asset tagging module 106 can select the available placements for the asset tag 126 based on the type and model number of the component. For example, the asset tag 126 may be placed on the bottom surface of the component 124, on a back panel of the component, and the like. Additionally, the online asset tagging module 106 can determine if there are multiple locations on a specific surface that the asset tag can be placed, such as the center of the back panel, the left bottom corner of the back panel, or the top back right corner of the back panel as shown in the component image 308. When the user is finished selecting the placement of the asset tag 126, the online asset tagging module 106 can store the information and the placement for the asset tag in the asset tagging data 118 portion of the database 108.

Referring again to FIG. 1, an administrator of the asset tagging system 100 can utilize the administrator web browser 112 to connect with the administration module 114 and view the order data 116 and the asset tagging data 118. The administration module 114 can transmit the order data 116 and the asset tagging data 118 from the database 108 to the administrator web browser 112 so that the administrator can review the data and make sure that the asset tagging data is correct. The administration module 114 can also access the manufacturer server 110 to retrieve information about the label printing process 120 and BIOS burn process 122 for each of the ordered components 124. Thus, the administrator can utilize the administrator web browser 112 and the administration module 114 to access and/or maintain the asset tag data 116 associated with the component 124.

The manufacturer server 110 can retrieve the order data 116 and the asset tagging data 118 so that the ordered component 124 can be assembled, can have the asset tag 126 affixed on the component and/or the packaging 128, and the component can then be shipped to the user. During the assembly of the component 124, the manufacturer server 110 can use the asset tagging data 118 in the label printing process 120, such that the information selected or uploaded by the user can be printed on the asset tag 126. If the user selected to have the asset tag 128 affixed to both the component 124 and packaging 128 for the component, the manufacturer server 110 can print multiple asset tags during the label printing process 120 to be placed on both the component and the packaging.

The manufacturer server 110 can also use the asset tagging data 118 from the database 108 to create an electronic asset tag 130 for the component 124. The electronic asset tag 130 can be written into the BIOS memory of the component, such that the electronic asset tag is embedded into the BIOS memory during the BIOS burn process 122. In an embodiment, the electronic asset tag 130 can be written into the complementary metal-oxide-semiconductor (CMOS) memory of the BIOS. The electronic asset tag 130 can be limited in length, such that only a limited amount of space is used in the BIOS. In an embodiment, the embedded electronic asset tag 130 can be the order number from the physical asset tag 126 or another identification number associated with the component 124. Thus, the user can identify the component 124 by accessing the electronic asset tag 130 written in the BIOS of the component.

Figure 4:
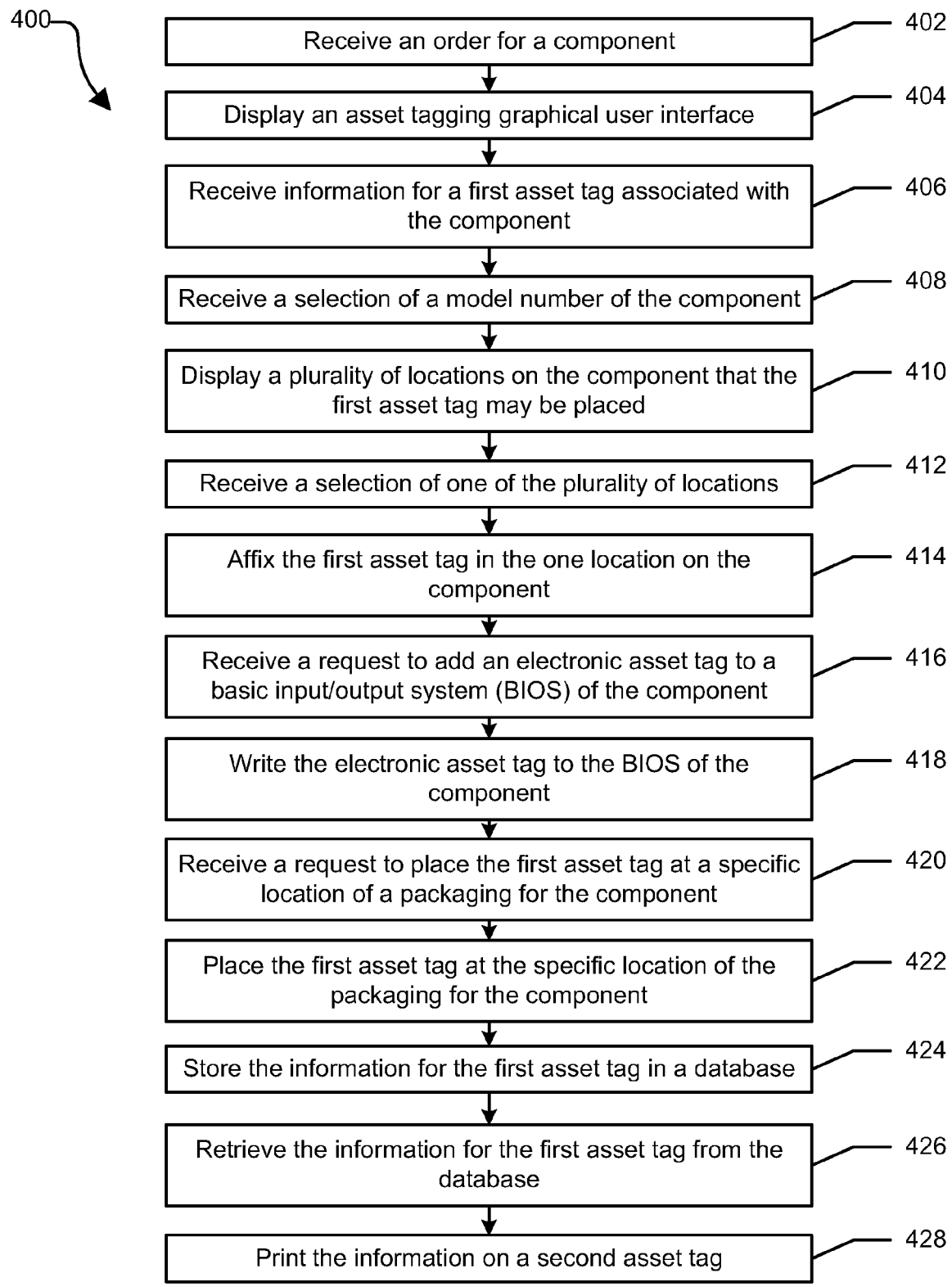
FIG. 4 is a flow diagram of a method for providing an asset tag for an ordered component.

FIG. 4 shows a flow diagram of a method 400 for providing an asset tag for an ordered component. At block 402, an order for a component is received. The order can be received from a web browser of a user. An asset tagging graphical user interface is displayed on the web browser at block 404. The asset tagging graphical user interface can include information for a first asset tag, different model numbers associated with the component, multiple locations that the asset tag can be placed on the component, and the like. At block 406, information for the first asset tag associated with the component is received. The information can include a logo, a company name, an order number, a telephone number, a service code number, and the like. A selection of a model of the component is received at block 408.

At block 410, multiple locations on the component that the first asset tag may be placed are displayed. The locations can be based on the selected model number of the component. A selection of one of the multiple locations is received at block 412. At block 414, the first asset tag is affixed in the one location on the component. The first asset tag is preferably affixed to the component prior to the component being placed in a packaging for the component. A request to add an electronic asset tag in a BIOS of the component is received at block 416. At block 418, the electronic asset tag is written in the BIOS of the component.

At block 420, a request to place the first asset tag at a specific location of packaging for the component is received. The first asset tag is placed at the specific location of the packaging of the component at block 422. At block 424, the information for the first asset tag is stored in a database. The information for the first asset tag is retrieved from the database at block 426. The asset tag information can be used at a later time to create additional asset tags. At block 428, the information is printed on a second asset tag.

Figure 5:
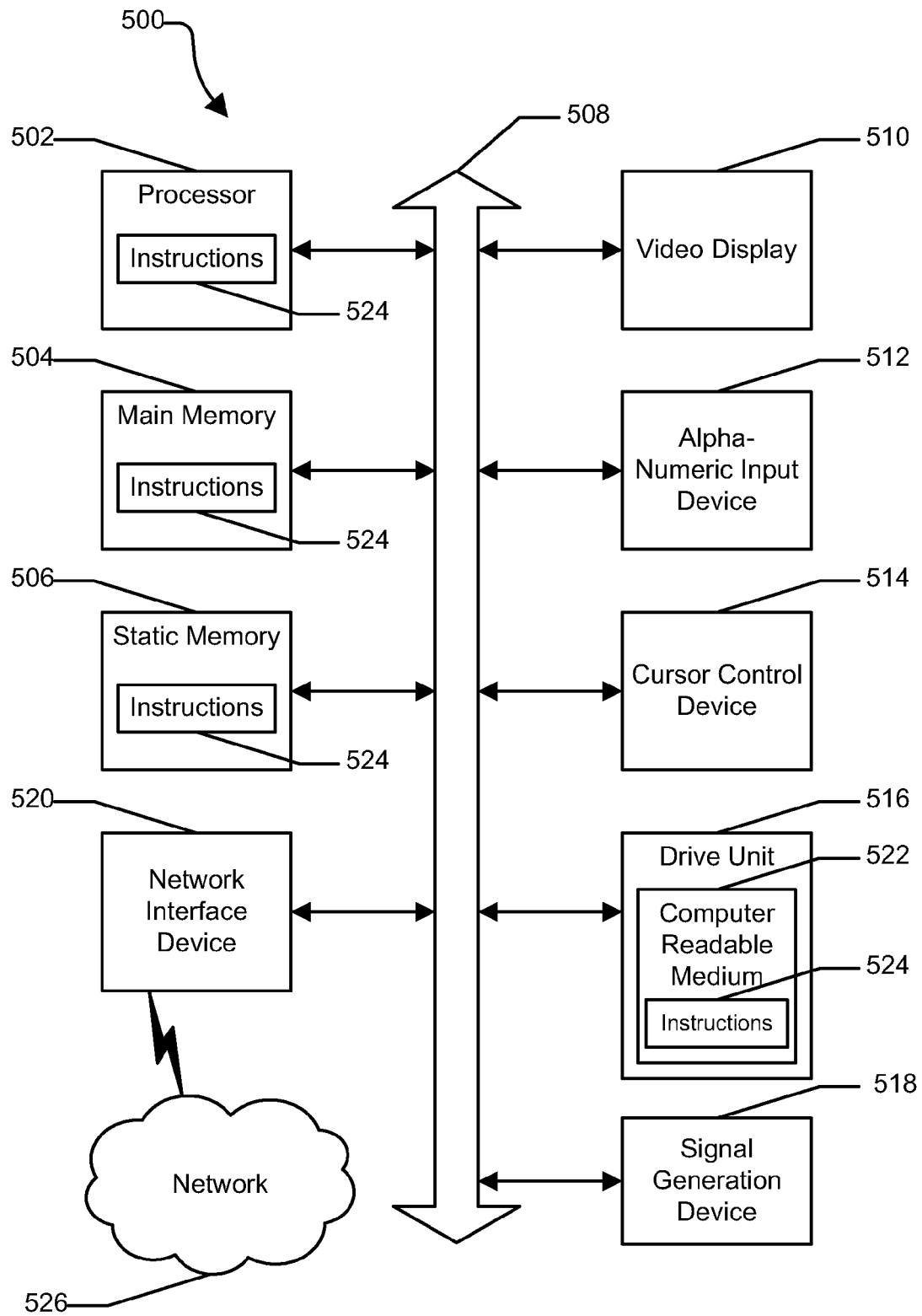
FIG. 5 is a block diagram of a general computer system.

FIG. 5 shows an illustrative embodiment of a general computer system 500 in accordance with at least one embodiment of the present disclosure. The computer system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502 such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524 such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising:
   an ordering module configured to receive an order for a component from a first web browser;
   an asset tagging module configured to receive an upload of a previously created image including information for an asset tag from the first web browser, and to receive a selection of a location on the component to place the asset tag including the previously created image;
   a database in communication with the ordering module and with the asset tagging module, the database configured to store the order for the component, the information for the asset tag, and the location of the asset tag on the component; and
   a manufacturer server in communication with the database, the manufacturer server configured to retrieve the order for the component, the information for the asset tag, and the location of the asset tag on the component, and configured to direct printing of the information on the asset tag and placement of the asset tag at the location on the component prior to placing the component in a packaging for the component.

2. The system of claim 1 further comprising:
   an administration module in communication with the database, the administration module configured to send the information for the asset tag to a second web browser.

3. The system of claim 1 wherein the asset tagging module is further configured to receive a request to add an electronic asset tag to a basic input/output system of the component, and the manufacturer server is further configured to write the electronic asset tag to the basic input/output system of the component.

4. The system of claim 1 wherein the asset tagging module is further configured to receive a request to place the asset tag at a specific location of the packaging for the component, and the manufacturer server is further configured to place the asset tag at the specific location of the packaging.

5. The system of claim 1 wherein the information on the first asset tag is a logo, a company name, an order number, a telephone number, a service code number, or any combination thereof.

6. The system of claim 1 wherein the first asset tag is an identification item for the component.

7. A non-transitory computer readable medium comprising a plurality of instructions to manipulate a processor, the plurality of instructions comprising:
   instructions to receive an order for a component;
   instructions to receive information for a first asset tag associated with the component;
   instructions to receive a selection of a model number of the component;
   instructions to display a plurality of locations on the component that the first asset tag may be placed based on the model number of the component;
   instructions to receive a selection of one of the plurality of locations;
   instructions to display a placement preview including a component image showing the first asset tag at the selected one of the locations on the component; and
   instructions to, in response to receiving the selection of the one of the plurality of locations, affix the first asset tag in the one of the plurality of locations on the component prior to placing the component in a packaging for the component.

8. The non-transitory computer readable medium of claim 7 further comprising:
   instructions to receive a request to add an electronic asset tag to a basic input/output system of the component; and
   instructions to write the electronic asset tag to the basic input/output system of the component.

9. The non-transitory computer readable medium of claim 8 wherein writing the electronic asset tag to the basic input/output system of the component includes storing the electronic asset tag in a complementary metal-oxide-semiconductor memory of the basis input/output system.

10. The non-transitory computer readable medium of claim 7 further comprising:
    instructions to receive a request to place the first asset tag at a specific location of the packaging for the component; and
    instructions to place the first asset tag at the specific location of the packaging for the component.

11. The non-transitory computer readable medium of claim 7 further comprising:
    instructions to store the information for the first asset tag in a database;
    instructions to retrieve the information for the first asset tag from the database; and
    instructions to print the information on a second asset tag.

12. The non-transitory computer readable medium of claim 7 wherein the information on the first asset tag is a logo, a company name, an order number, a telephone number, a service code number, or any combination thereof.

13. The non-transitory computer readable medium of claim 7 wherein the first asset tag is an identification item for the component.

14. A method comprising:
    receiving an order for a component;
    receiving a selection of specific information to include in a first asset tag associated with the component;
    receiving the specific information for the first asset tag associated with the component in response to receiving the selection;
    displaying an asset tag preview image including the specific information for the first asset tag;
    displaying a plurality of locations on the component that the first asset tag may be placed based on the model number of the component;
    receiving a selection of one of the plurality of locations;
    affixing the first asset tag in the one of the plurality of locations on the component in response to receiving the selection of the one of the plurality of locations;

receiving a request to add an electronic asset tag to a basic input/output system of the component; and writing the electronic asset tag to the basic input/output system of the component.

15. The method of claim 14 wherein writing the electronic asset tag to the basic input/output system of the component includes storing the electronic asset tag in a complementary metal-oxide-semiconductor memory of the basis input/output system.

16. The method of claim 14 further comprising:
receiving a request to place the first asset tag at a specific location of packaging for the component; and
placing the first asset tag at the specific location of the packaging for the component.

17. The method of claim 14 further comprising:
storing the specific information for the first asset tag in a database;
retrieving the specific information for the first asset tag from the database; and
printing the specific information on a second asset tag.

18. The method of claim 14 wherein the specific information on the first asset tag is a logo, a company name, an order number, a telephone number, a service code number, or any combination thereof.

19. The method of claim 14 wherein the first asset tag is an identification item for the component.

* * * * *